(12) United States Patent
Sakamaki et al.

(10) Patent No.: US 6,264,208 B1
(45) Date of Patent: Jul. 24, 2001

(54) CHUCK ASSEMBLY

(75) Inventors: Kazuo Sakamaki; Akira Sakamaki; Tetuo Seki; Hisashi Ikehara, all of Ojiya (JP)

(73) Assignee: Ukiwa Seiko Kabushiki Kaisha, Niigata-Ken (JP)

( * ) Notice: Subject to any disclaimer, the term of this patent is extended or adjusted under 35 U.S.C. 154(b) by 0 days.

(21) Appl. No.: 09/413,847

(22) Filed: Oct. 7, 1999

(30) Foreign Application Priority Data

Oct. 9, 1998 (JP) .................................................. 10-288076
Sep. 16, 1999 (JP) .................................................. 11-262229

(51) Int. Cl.[7] ................................ B23B 31/20; B23C 1/20
(52) U.S. Cl. ............................ 279/43.4; 279/50; 279/57; 279/74; 279/82; 279/146; 279/147; 409/182
(58) Field of Search ........................... 279/43, 43.1, 43.2, 279/43.4, 50, 57, 74, 75, 82, 146, 147; 409/182

(56) References Cited

U.S. PATENT DOCUMENTS

| | | | |
|---|---|---|---|
| 5,921,730 | 7/1999 | Young et al. .......................... | 409/182 |
| 5,997,225 | * 12/1999 | Young et al. .......................... | 409/182 |
| 6,045,306 | * 4/2000 | Buddendeck et al. ................ | 409/182 |
| 6,079,917 | * 6/2000 | Miksa et al. .......................... | 409/182 |

* cited by examiner

*Primary Examiner*—Steven C. Bishop
(74) *Attorney, Agent, or Firm*—Sughrue, Mion, Zinn, Macpeak & Seas, PLLC

(57) ABSTRACT

To provide a chuck assembly which is superior in practical usability and workability in clamping and fixing a tool to a spindle without fail and with ease by lever-operation of a specialized operational jig, a taper portion is provided on at least one of an inner circumferential wall of the sleeve portion and an outer circumferential wall of the tool clamping portion, the tool clamping portion and the sleeve portion are brought into contact with each other at the taper portion, a retainer portion for retaining the operational jig is provided on the sleeve portion, a support portion is provided in a predetermined position of the chuck assembly body for supporting the operational jig retained at the retainer portion, the sleeve portion retained by the operational jig is slidingly moved relative to the tool clamping portion when the operational jig is lever-operated in a taper direction of the taper portion by using the support portion as a fulcrum, and the opening portion of the tool clamping portion is widened/narrowed by taper action of the taper portion by the sliding movement of the sleeve portion.

15 Claims, 4 Drawing Sheets

CHUCK ASSEMBLY

BACKGROUND OF THE INVENTION

The present invention relates to a chuck assembly for chucking a drill or the like.

FIG. 5 shows a conventional chuck assembly used for a router machining tool or the like. The chuck assembly is composed a spindle 22 provided with an opening portion 21, chucks 24 provided in the opening portion 21 for defining an opening portion for clamping a tool 20, and a sleeve 25 provided with a pressure member 28 for narrowing the opening portion 23 of the chucks 24. In the conventional example shown in FIG. 5, when the sleeve 25 is screwed and moved toward the right of FIG. 5, the tool 20 is clamped and fixed by the pressure of the pressure member 28.

By the way, in the clamping and fixing work of the tool 20 according to the conventional example shown in FIG. 5, for example, a wrench for holding the spindle 22 to be unrotatable and an operational jig for operatively rotating the sleeve 25 are prepared. The spindle 22 is prevented from rotating by being held with the wrench. The operational tool is retained at retainer recesses 26 of the sleeve 25. The sleeve 25 is rotated relative to the spindle 22. Accordingly, the worker has to hold the tool inserted into the opening portion 23 of the chucks 24 in addition to the wrench for preventing the rotation of the spindle 22 and the operational jig for rotating the sleeve 25. Thus, the tool clamping and fixing work is very troublesome. Incidentally, reference numeral 27 in FIG. 5 denotes a taper portion formed in an inner circumferential wall of the opening portion 21 of the spindle 22.

Also, another conventional example of a chuck assembly has been proposed in which a suitable lock mechanism is provided, and the sleeve is rotated after the rotation of the spindle is prevented by the operation of the lock mechanism.

In this conventional example, in the clamping and fixing work of the tool, it is unnecessary to manually hold the spindle due to the existence of the lock mechanism. Accordingly, in comparison with the conventional example shown in FIG. 5, the workability becomes better. However, the lock mechanism becomes intricate so that the cost therefor is high.

SUMMARY OF THE INVENTION

In order to overcome the above-noted difficulties, an object of the present invention is to provide a chuck assembly which is superior in practical usability and workability in clamping and fixing a tool to a spindle without fail and with ease by lever-operation of a specialized operational jig.

According to a first aspect of the present invention, there is provided a chuck assembly system comprising a chuck assembly body for clamping a working tool and an operational tool for operating said chuck assembly body, characterized in that said chuck assembly body includes a tool clamping portion provided with an opening portion for clamping the tool and a sleeve portion for widening/narrowing the opening portion, a taper portion is provided on at least one of an inner circumferential wall of said sleeve portion and an outer circumferential wall of said tool clamping portion, said tool clamping portion and said sleeve portion are brought into contact with each other at the taper portion, a retainer portion for retaining the operational jig is provided on said sleeve portion, a support portion is provided in a predetermined position of said chuck assembly body for supporting the operational jig retained at the retainer portion, the operational jig slidingly moves said sleeve portion, said sleeve portion retained by the operational jig is slidingly moved relative to the tool clamping portion when the operational jig is lever-operated in a taper direction of the taper portion by using the support portion as a fulcrum, and the opening portion of the tool clamping portion is widened/narrowed by taper action of the taper portion by the sliding movement of the sleeve portion.

According to a second aspect of the invention, in the chuck assembly system according to the first aspect of the invention, the taper portions are provided on both of said tool clamping portion and said sleeve portion, the taper portion on the outer circumferential wall of said tool clamping portion is formed into a taper portion tapered toward a tip end and the taper portion of the inner circumferential wall of said sleeve portion is formed into a taper portion that engages with the taper portion of said tool clamping portion in a taper manner, said sleeve portion is slidable back and forth, said sleeve portion retained by the operational jig is slidingly moved back and forth relative to said tool clamping portion when the operational jig is lever-operated back and forth of said sleeve portion by using the support portion as the fulcrum, and the opening portion of said tool clamping portion is widened/narrowed by the taper action of the taper portions by the sliding movement of the sleeve portion.

In the chuck assembly according to an eleventh aspect of the invention in the seventh aspect of the invention, the projections of the operational jig are bent at the position in the vicinity of an extension line of the engagement edge.

In the chuck assembly system according to a fourth aspect of the invention in the second aspect of the invention, the operational jig is formed discretely from said chuck assembly body.

In the chuck assembly system according to a fifth aspect of the invention in the third aspect of the invention, a convex portion is formed at a tip end of the operational jig, a retainer portion of said sleeve portion is formed into a concave portion, and the convex portion of the operational jig and the retainer portion of said sleeve portion are engaged with each other in a convex/concave manner.

In the chuck assembly system according to a sixth aspect of the invention in the fourth aspect of the invention, a convex portion is formed at a tip end of the operational jig, a retainer portion of said sleeve portion is formed into a concave portion, and the convex portion of the operational jig and the retainer portion of said sleeve portion are engaged with each other in a convex/concave manner.

In the chuck assembly system according to a seventh aspect of the invention in the fifth aspect of the invention, the operational tool is formed integrally by a grip portion and a working portion, a pair of projections are formed in a widthwise direction of said working portion, the projections are provided with convex portion facing inwardly, and an engagement edge for engaging with the support portion is provided in the projections.

Also, in the chuck assembly system according to an eight aspect of the invention in the sixth aspect of the invention, the operational tool is formed integrally by a grip portion and a working portion, a pair of projections are formed in a widthwise direction of said working portion, the projections are provided with convex portion facing inwardly, and an engagement edge for engaging with the support portion is provided in the projections.

In the chuck assembly system according to a ninth aspect of the invention in the seventh aspect of the invention, a recess portion is provided on the side of said grip portion in the vicinity of the engagement edge.

In the chuck assembly system according to a tenth aspect of the invention in the eighth aspect of the invention, a recess portion is provided on the side of said grip portion in the vicinity of the engagement edge.

In the chuck assembly system according to an eleventh aspect of the invention in the seventh aspect of the invention, the projections of the operational jig are bent at the position in the vicinity of an extension line of the engagement edge.

In the chuck assembly system according to a twelfth aspect of the invention in the eighth aspect, the projections of the operational jig are bent at the position in the vicinity of an extension line of the engagement edge.

In the chuck assembly system according to a thirteenth aspect of the invention in the ninth aspect, the projections of the operational jig are bent at the position in the vicinity of an extension line of the engagement edge.

In the chuck assembly system according to a fourteenth aspect of the invention in the tenth aspect, the projections of the operational jig are bent at the position in the vicinity of an extension line of the engagement edge.

In the chuck assembly system according to a fifteenth aspect of the invention in any of the preceding aspects, a taper angle of the taper portion is set in the range of 1 to 5 relative to a rotary shaft of the tool clamping portion.

When the operational jig is retained at the retainer portions of the sleeve portion, the operational jig is lever-operated in the taper direction of the taper portion by using as a fulcrum the support portion provided in, for example, the tool clamping portion of the chuck assembly body, the operational jig slidingly moves the sleeve portion while drawing or pushing the sleeve portion by the operational jig, the opening portion of the tool clamping portion is widened/narrowed by the taper action of the taper portions and the sliding movement of the sleeve, and the clamping and fixing action of the tool to the tool clamping portion and the removal therefrom may be performed.

According to the present invention, it is possible to attain to a chuck assembly which is superior in practical usability and workability in clamping and fixing a tool to a tool clamping portion without fail and with ease by lever-operation of a specialized operational jig.

DESCRIPTION OF THE PREFERRED EMBODIMENTS

Figure 1:
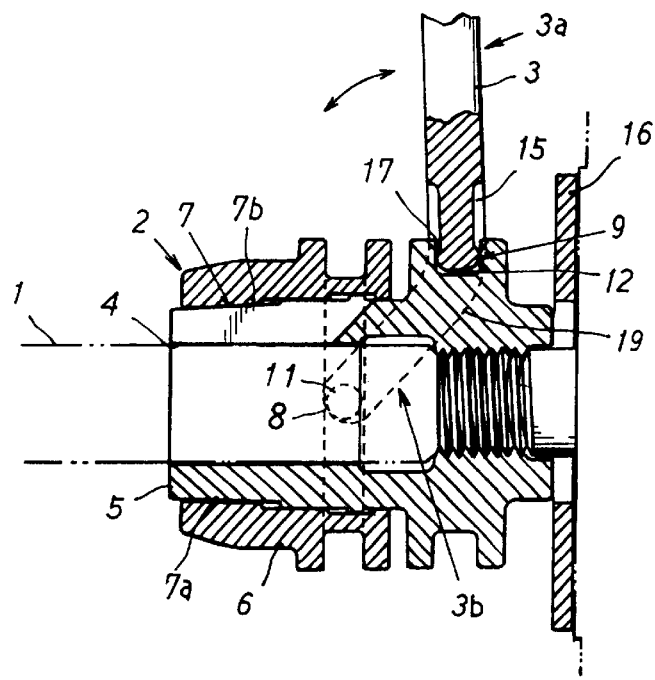
FIG. 1 is an illustrative side elevational cross-sectional view of a chuck assembly system according to an embodiment of the present invention.
Figure 2:
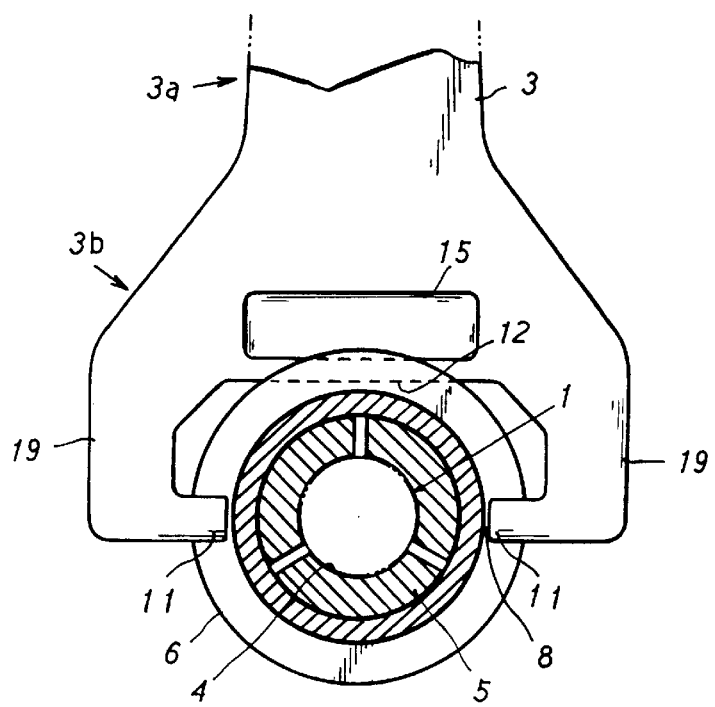
FIG. 2 is an illustrative frontal elevational view of the chuck assembly system according to the embodiment of the present invention.
Figure 3:
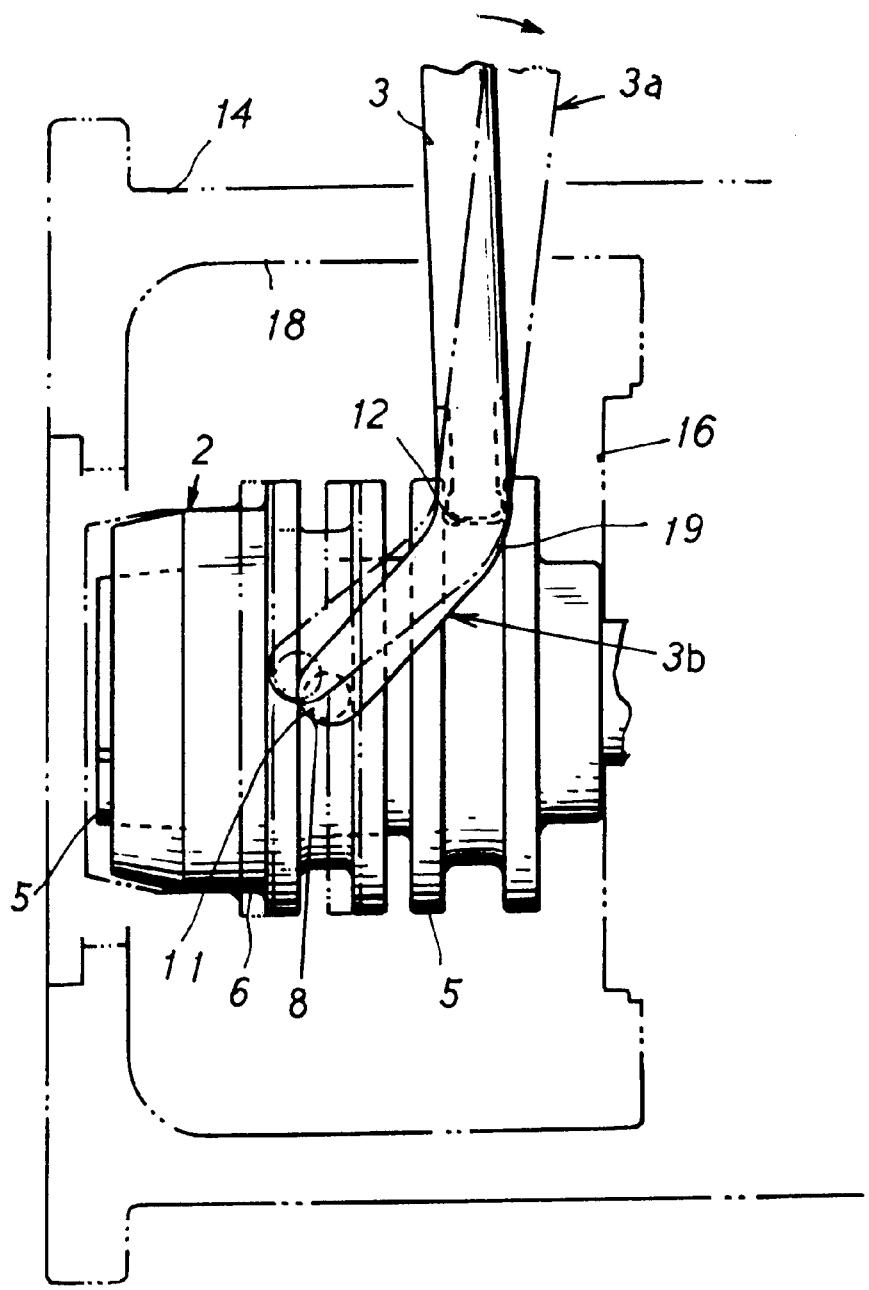
FIG. 3 is an illustrative view showing an operational condition of the embodiment.
Figure 4:
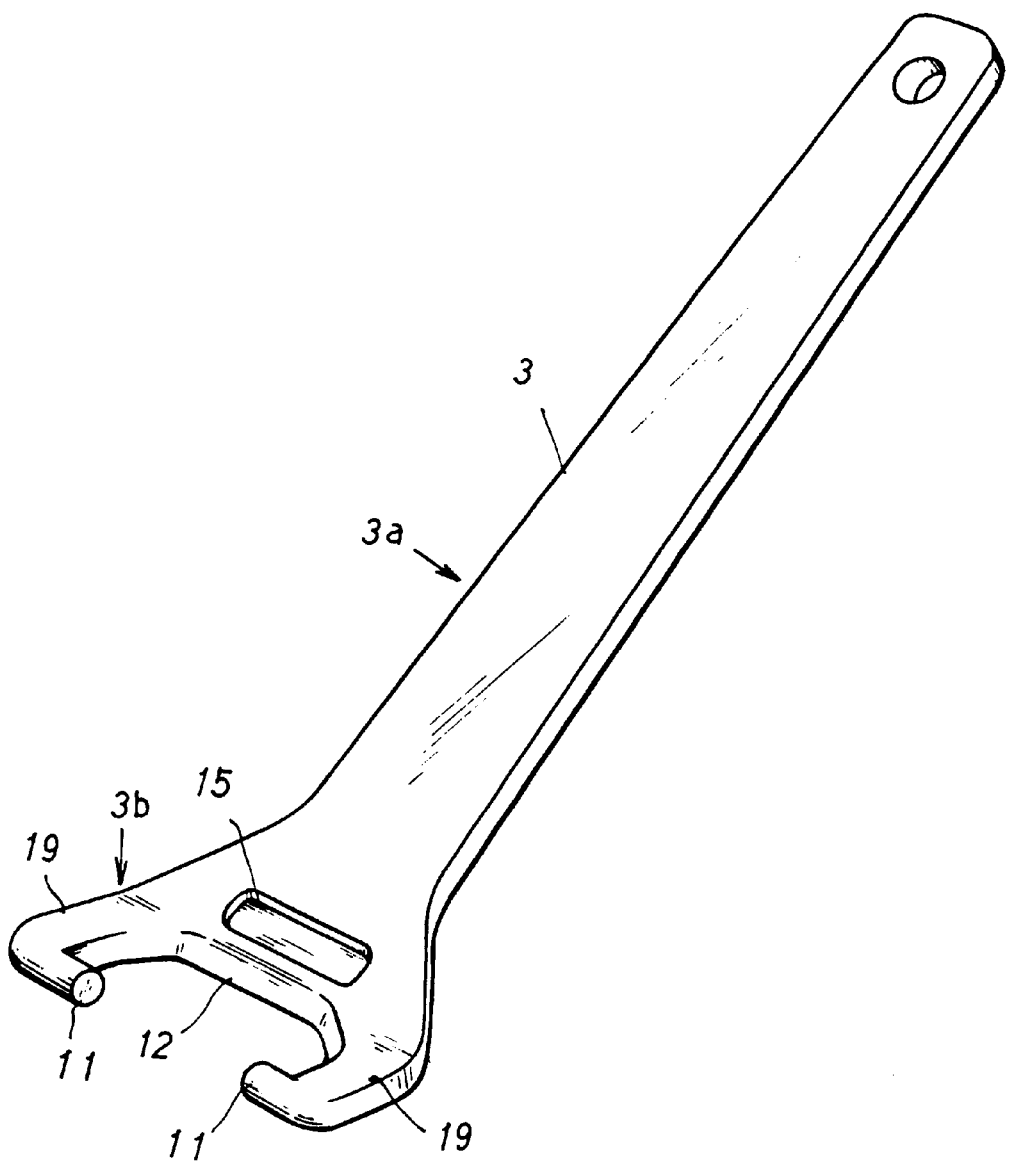
FIG. 4 is an illustrative perspective view of an operational jig according to the embodiment.
Figure 5:
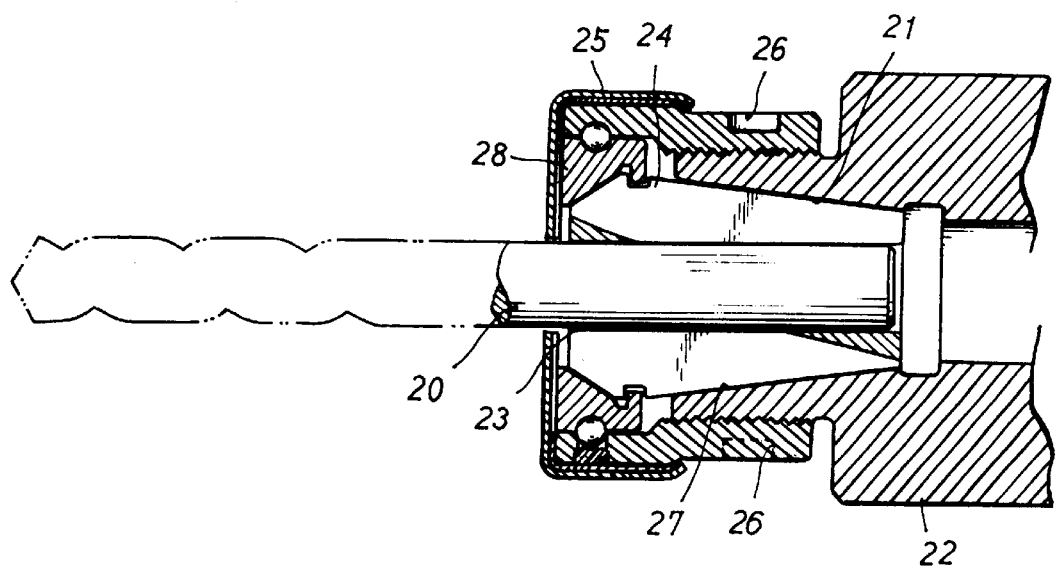
FIG. 5 is an illustrative side elevational cross-sectional view of a conventional chuck assembly system.

The present invention will now be described with reference to the accompanying drawings.

According to an embodiment of the present invention, a chuck assembly for a router machining tool used in machining a corner or a surface is composed of a chuck assembly body 2 for clamping a tool 1 such as a drill and an operational jig 3 for operating the chuck body 2. The chuck assembly body 2 has a tool clamping portion 5 (spindle and chucks) provided with an opening portion 4 for clamping the tool 1 and a sleeve portion 6 for widening/narrowing the opening portion 4. Taper portions 7a and 7b are formed in an outer circumferential wall of the tool clamping portion 5 and an inner circumferential wall of the sleeve portion 6. The tool clamping portion 5 and the sleeve portion 6 are brought into contact with each other at the taper portions 7a and 7b. Each retainer portion 8 is provided for retaining the operational jig 3. A support portion 9 is provided at a suitable position of the chuck assembly body 2 for supporting the operational jig 3 retained at the retainer portions 8. The operational jig 3 allows the sleeve portion 6 to slidingly move. When the operational jig 3 is slidingly operated in the taper direction of the taper portions 7a and 7b by using the above-described support portion 9 as a fulcrum, the sleeve portion 6 retained by the operational jig 3 is slidingly moved relative to the tool clamping portion 5. The opening portion 4 of the tool clamping portion 5 is widened or narrowed by the taper action of the taper portions 7a and 7b by the sliding movement of the sleeve portion 6.

Also, the taper portion 7a on the outer circumferential wall of the tool clamping portion 5 is formed into a taper shape to be thinner toward the front tip, and the taper portion 7b on the inner circumferential wall of the sleeve portion 6 is formed into a taper portion that may engage with the taper portion 7a of the tool clamping portion 5 in a taper manner. Accordingly, the sleeve portion 6 may be slidingly moved back and forth (in the right and left direction in FIG. 1) of the chuck assembly body 2. When the operational jig 3 is lever-operated operated back and forth (i.e., in the taper direction, in the right and left direction in FIG. 1) of the sleeve portion 6 by using the support portion 9 as a fulcrum, the sleeve portion 6 retained by the operational jig 3 is slidingly moved back and forth relative to the tool clamping portion 5. Incidentally, the taper portion 7 may be formed on either one of the outer circumferential wall of the tool clamping portion 5 or the inner circumferential wall of the sleeve portion 6, but it is preferable to provide the taper portions on both the tool clamping portion 5 and the sleeve portion 6 so that both components are in taper engagement with each other without any displacement or rattle and the sleeve portion 6 may pressingly retain the tool clamping portion 5.

A taper angle of the taper portions 7a and 7b is set in the slant condition at an angle of 1 to 5 relative to a rotary shaft of the tool clamping portion 5. If the taper angle is set at an excessive angle, when the router machining is performed in this embodiment, the sleeve 6 is likely to be slidingly moved back and forth by the vibration of the machining work so that the opening portion 4 of the tool clamping portion 5 is loosened and the tool 1 clamped and fixed to the opening portion 4 would fall apart. Also, if the taper angle is too small, the leverage amount in operation of the operational jig 3 should be increased. In particular, in the case where, as in the router machining tool shown, a frame portion 14 located in the vicinity of the chuck assembly body 2 is like to interfere with the leverage operation of the operational jig 3, a problem would become remarkable. In view of these points, the suitable range of the taper angle of the taper portions 7a and 7b was obtained by experiments. It was found that the taper angle was most preferably 1.5 relative to the rotary shaft of the tool clamping portion 5. It was also found that the similar effect may be obtained when the taper angle was in the range of 1 to 5.

The retainer portions 8 of the sleeve portion 6 are formed into a recess shape. Also, in this embodiment, the retainer portions 8 of the sleeve portion 6 are in the form of corrugated grooves in the circumferential direction of the sleeve portion 6.

Also, the support portion 9 is formed in the tool clamping portion 5. Accordingly, in the case where the tool clamping portion 5 and the sleeve portion 6 are manufactured and sold on the market as a kit under the same standards, the positional relationship between the support portion 9 of the tool clamping portion 5 and the retainer portions 8 of the sleeve portion 6 may be kept constant. It is possible to operate the operational jig 3 under the same standards. This is advantageous in comparison with the case where the support portion 9 is provided on a portion other than the tool clamping portion 5 (for instance, in the case where the support portion may be formed on a proximal portion 16 of the chuck assembly body 2 on which the tool clamping portion 5 is provided). Namely, if the positional relationship between the support portion 9 and the retainer portions 8 is changed, it is impossible to use the same operational jig 3 and it is necessary to provide an operational jig 3 suitable for every assembly in which the positional relationship between the support portion 9 and the retainer portions 8 is changed. This is inconvenient.

The operational jig 3 is integrally formed by a grip portion 3*a* and the working portion 3*b*. A pair of projections 19 are formed in the working portion 3*b* on both sides of the width direction. Each of the projections 19 has a convex portion 11 facing inwardly. An engagement edge 12 that is to engage with the above-described support portion 9 is formed between the above-described projections 19. Accordingly, when the operational jig 3 is operated in the leverage manner, it is possible to bring the sleeve portion 6 into the clamped condition by the respective projections 19 of the operational jig 3. When the operational jig 3 is operated in the leverage manner, the sleeve portion 6 may be uniformly pushed or drawn from both sides. As a result, the pressure application or the pressure release may be well performed to the tool clamping portion 5 which is widened or narrowed by the sliding motion of the sleeve portion 6.

Also, the operational jig 3 takes a shape that the projections 19 are bent in the vicinity of the extension line of the engagement edge 12. Accordingly, when the convex portions 11 of the operational jig 3 are engaged with the retainer portions 8, it is possible to move the operational jig 3 downwardly from above. This is advantageous in operationability. For example, if the operational jig 3 is not bent, when the convex portions 11 of the operational jig 3 are engaged with the retainer portions 8, there is fear that the operation jig 3 would collide against the proximal portion 16 of the chuck assembly body 2. However, in this embodiment, since the operational jig 3 takes a structure in which the projections are bent, the jig is free from such a problem.

Also, the engagement edge 12 of the operational jig 3 takes a structure in which the edge may engage with the support portion 9 of the tool clamping portion 5 in a concave/convex manner. Accordingly, when the operational jig 3 is lever-operated, there is no fear that the engagement edge 12 of the operational jig 3 would be offset from the support portion 9.

Also, in this embodiment, the concave groove is adopted as the support portion 9 of the tool clamping portion 5 and the engagement edge 12 of the operational jig 3 may engage with the recess groove. However, in this case, there is a fear that when the operational jig 3 is lever-operated, the vicinity of the engagement edge 12 of the operational jig 3 on the side of the grip portion 3*a* would be brought into contact with the inner wall portion of the concave groove to interfere with the leverage motion. Accordingly, in this embodiment, recess portions 15 are formed on the front and rear sides of the vicinity of the engagement edge 12 of the operational jig 3 on the side of the grip portion 3*a* so that the vicinity of the engagement edge 12 is prevented from being brought into contact with the inner wall portion of the recess groove by the recess portions 15. Incidentally, if a width of the concave groove is considerably large in comparison with the engagement edge 12, it is also possible to solve the problem that the vicinity of the engagement edge 12 would be brought into contact with the inner wall portion of the concave groove.

In the case where the tool 1 is fixed to the chuck assembly body 2 in accordance with this embodiment, the convex portions 11 provided at the tip ends of the operational jig 3 are retained at the retainer portions 8 of the sleeve portion 6, the engagement edge 12 of the operational jig 3 is engaged with the support portion 9 of the tool clamping portion 5, the operational jig 3 is lever-operated toward the front end of the chuck assembly body 2 by using as a fulcrum the tip end of the above-described tool clamping portion 5 of the support portion 9, the sleeve portion 6 is slidingly moved on the rear side (in the direction on the proximal portion 16 of the chuck assembly body 2 on which the tool clamping portion 5 is provided), the tool clamping portion 5 is pressed by the sleeve portion 6 by the taper action of the taper portions 7*a* and 7*b*, and the opening portion 4 of the tool clamping portion 5 is narrowed to thereby clamp and fix the tool 1 to the opening portion 4. Accordingly, the tool 1 is gripped and inserted into opening portion 4 of the tool clamping portion 5 by one hand and the operational jig 3 is lever-operated by the other hand so that the tool 1 may be clamped and fixed to the opening portion 4 of the tool clamping portion 5.

When the machining work such as router machining is to be performed by this tool 1, the operational jig 3 is removed away from the chuck assembly body 2.

Also, when the tool 1 is removed away from the chuck assembly body 2, in the same operation as described above, the convex portions 11 provided at the tip ends of the operational jig 3 are retained at the retainer portions 8 of the sleeve portion 6, the engagement edge 12 of the operational jig 3 is engaged with the support portion 9 of the tool clamping portion 5, the operational jig 3 is lever-operated toward the proximal end of the chuck assembly body 2 by using as a fulcrum the proximal end 16 side of the above-described chuck assembly body 2 of the support portion 9, the sleeve portion 6 is slidingly moved on the front side (in the direction on the tip end side of the tool clamping portion 5), the tool clamping portion 5 is released from the sleeve portion 6 by the taper action of the taper portions 7*a* and 7*b*, and the opening portion 4 of the tool clamping portion 5 is widened to thereby remove the tool 1 away from the opening portion 4. Accordingly, the tool 1 may be gripped by one hand and the operational jig 3 may be lever-operated by the other hand.

With such an arrangement in the embodiment, by the lever-operation of the operational jig 3, the sleeve portion 6 is slidingly moved. Accordingly, it is possible to provide the chuck assembly that is superior in practical operationability and workability so that the tool 1 may be quickly clamped and fixed to the tool clamping portion 5 without fail and with ease by two hands of a single person.

Also, in this embodiment, also in a machining tool in which a hole portion 18 is provided in a frame portion 14 provided around the chuck assembly body 2 as in the rooter machining tool shown, it is possible to insert the operational jig 3 from the hole portion 18 and to retain it the retainer portions 8 to thereby perform the lever-operation of the operational jig 3 without any interference with the frame portion 14 and to thereby firmly clamp the tool 1 to the tool clamping portion 5. However, the frame portion 14 interferes with the rotational motion of the wrench in the conventional method in which the sleeve is rotated by the wrench. Thus, it is complicated to fix the tool 1 to the tool clamping portion 5. In this respect, according to the present invention, it is possible to provide a chuck assembly that is superior in practical operationability and workability by using a method of the leverage motion of the operational jig 3.

Also, it should be noted that since the slant direction of the taper portions 7a and 7b is toward the back and forth of the chuck assembly body 2 and different from the rotational direction of the chuck assembly body 2 in working such as rooter machining, there is no fear that the sleeve portion 6 would be rotated accidentally and the clamp and fixture condition of the tool 1 to the tool clamping portion 5 may be maintained firmly. It is thus possible to provide a chuck assembly which is much superior in practical use.

Various details of the invention may be changed without departing from its spirit nor its scope. Furthermore, the foregoing description of the embodiments according to the present invention is provided for the purpose of illustration only, and not for the purpose of limiting the invention as defined by the appended claims and their equivalents.

What is claimed is:

1. A chuck assembly system comprising a chuck assembly body for clamping a working tool and an operational jig for operating said chuck assembly body, characterized in that said chuck assembly body includes a tool clamping portion provided with an opening portion for clamping the tool and a sleeve portion for widening/narrowing the opening portion, a taper portion is provided on at least one of an inner circumferential wall of said sleeve portion and an outer circumferential wall of said tool clamping portion, said tool clamping portion and said sleeve portion are brought into contact with each other at the taper portion, a retainer portion for retaining the operational jig is provided on said sleeve portion, a support portion is provided in a predetermined position of said chuck assembly body for supporting the operational jig retained at the retainer portion, the operational jig slidingly moves said sleeve portion, said sleeve portion retained by the operational jig is slidingly moved relative to the tool clamping portion when the operational jig is lever-operated in a taper direction of the taper portion by using the support portion as a fulcrum, and the opening portion of the tool clamping portion is widened/narrowed by taper action of the taper portion by the sliding movement of the sleeve portion.

2. The chuck assembly system according to claim 1, wherein the taper portions are provided on both of said tool clamping portion and said sleeve portion, the taper portion on the outer circumferential wall of said tool clamping portion is formed into a taper portion tapered toward a tip end and the taper portion of the inner circumferential wall of said sleeve portion is formed into a taper portion that engages with the taper portion of said tool clamping portion in a taper manner, said sleeve portion is slidable back and forth, said sleeve portion retained by the operational jig is slidingly moved back and forth relative to said tool clamping portion when the operational jig is lever-operated back and forth of said sleeve portion by using the support portion as the fulcrum, and the opening portion of said tool clamping portion is widened/narrowed by the taper action of the taper portions by the sliding movement of the sleeve portion.

3. The chuck assembly system according to claim 1, wherein the operational jig is formed discretely from said chuck assembly body.

4. The chuck assembly system according to claim 2, wherein the operational jig is formed discretely from said chuck assembly body.

5. The chuck assembly system according to claim 3, wherein a convex portion is formed at a tip end of the operational jig, a retainer portion of said sleeve portion is formed into a concave portion, and the convex portion of the operational jig and the retainer portion of said sleeve portion are engaged with each other in a convex/concave manner.

6. The chuck assembly system according to claim 4, wherein a convex portion is formed at a tip end of the operational jig, a retainer portion of said sleeve portion is formed into a concave portion, and the convex portion of the operational jig and the retainer portion of said sleeve portion are engaged with each other in a convex/concave manner.

7. The chuck assembly system according to claim 5, wherein the operational jig is formed integrally by a grip portion and a working portion, a pair of projections are formed in a widthwise direction of said working portion, the projections are provided with convex portion facing inwardly, and an engagement edge for engaging with the support portion is provided in the projections.

8. The chuck assembly system according to claim 6, wherein the operational jig is formed integrally by a grip portion and a working portion, a pair of projections are formed in a widthwise direction of said working portion, the projections are provided with convex portion facing inwardly, and an engagement edge for engaging with the support portion is provided in the projections.

9. The chuck assembly system according to claim 7, wherein a recess portion is provided on the side of said grip portion in the vicinity of the engagement edge.

10. The chuck assembly system according to claim 8, wherein a recess portion is provided on the side of said grip portion in the vicinity of the engagement edge.

11. The chuck assembly system according to claim 7, wherein the projections of the operational jig are bent at the position in the vicinity of an extension line of the engagement edge.

12. The chuck assembly system according to claim 8, wherein the projections of the operational jig are bent at the position in the vicinity of an extension line of the engagement edge.

13. The chuck assembly system according to claim 9, wherein the projections of the operational jig are bent at the position in the vicinity of an extension line of the engagement edge.

14. The chuck assembly system according to claim 10, wherein the projections of the operational jig are bent at the position in the vicinity of an extension line of the engagement edge.

15. The chuck assembly system according to one of claims 1 to 14, wherein a taper angle of the taper portion is set in the range of 1 to 5 relative to a rotary shaft of the tool clamping portion.

* * * * *

UNITED STATES PATENT AND TRADEMARK OFFICE
CERTIFICATE OF CORRECTION

PATENT NO. : 6,264,208 B1　　　　　　　　　　　　　　　　　　　　　　Page 1 of 1
DATED : July 24, 2001
INVENTOR(S) : Kazuo Sakamaki, Akira Sakamaki, Tetuo Seki, Hisashi Ikehara It is certified that error appears in the above-identified patent and that said Letters Patent is hereby corrected as shown below:

<u>Title page,</u>
Item [73], "Ukiwa" should read -- Yukiwa --.

Signed and Sealed this

First Day of January, 2002

*Attest:*

*Attesting Officer*　　　　　JAMES E. ROGAN
　　　　　　　　　　　*Director of the United States Patent and Trademark Office*

UNITED STATES PATENT AND TRADEMARK OFFICE
CERTIFICATE OF CORRECTION

PATENT NO.    : 6,264,208 B1
DATED         : July 24, 2001
INVENTOR(S)   : Kazuo Sakamaki, Akira Sakamaki, Tetuo Seki, Hisashi Ikehara It is certified that error appears in the above-identified patent and that said Letters Patent is hereby corrected as shown below:

<u>Column 2,</u>
Cancel lines 25-29, and insert therefor:

In the chuck assembly system according to a third aspect of the invention in the first aspect of the invention, the operational jig is formed discretely from said chuck assembly body.

Signed and Sealed this

Second Day of April, 2002

Attest:

JAMES E. ROGAN
*Director of the United States Patent and Trademark Office*

*Attesting Officer*